(12) United States Patent
Heuel et al.

(10) Patent No.: US 8,844,197 B2
(45) Date of Patent: Sep. 30, 2014

(54) SLIDING DOOR FOR A VEHICLE

(75) Inventors: Gerhard Heuel, Olpe (DE); Michael Krehmke, Plettenberg (DE); Ralf Rottmann, Drolshagen (DE)

(73) Assignee: Dura Automotive Body & Glass Systems GmbH (DE)

( * ) Notice: Subject to any disclaimer, the term of this patent is extended or adjusted under 35 U.S.C. 154(b) by 39 days.

(21) Appl. No.: 12/971,663

(22) Filed: Dec. 17, 2010

(65) Prior Publication Data

US 2011/0146161 A1 Jun. 23, 2011

(30) Foreign Application Priority Data

Dec. 17, 2009 (DE) .......................... 10 2009 058 583

(51) Int. Cl.
*E05D 15/10* (2006.01)
(52) U.S. Cl.
USPC .................... 49/216; 49/208; 49/221; 49/360
(58) Field of Classification Search
USPC ........... 49/208, 209, 210, 211, 213, 216, 217, 49/218, 219, 221, 223, 225, 360, 358; 296/155
See application file for complete search history.

(56) References Cited

U.S. PATENT DOCUMENTS

| | | | |
|---|---|---|---|
| 4,068,407 A * | 1/1978 | Podolan et al. .................. | 49/215 |
| 4,268,996 A * | 5/1981 | Allen ............................... | 49/212 |
| 4,606,146 A * | 8/1986 | Jozefozak ........................ | 49/216 |
| 4,869,544 A * | 9/1989 | Anwyll et al. ................. | 296/155 |
| 5,921,613 A * | 7/1999 | Breunig et al. ................ | 296/155 |
| 6,030,024 A * | 2/2000 | Schmidhuber et al. .. | 296/146.12 |
| 6,183,039 B1* | 2/2001 | Kohut et al. ................... | 296/155 |
| 7,644,976 B2* | 1/2010 | Suzuki et al. ............. | 296/146.12 |
| 7,731,270 B2* | 6/2010 | Fischer et al. ................. | 296/155 |
| 7,896,425 B2* | 3/2011 | Elliott et al. ............. | 296/146.12 |
| 2002/0180237 A1* | 12/2002 | Rogers et al. ................. | 296/155 |
| 2003/0204999 A1* | 11/2003 | George et al. .................. | 49/216 |
| 2006/0249983 A1* | 11/2006 | Heuel et al. ................... | 296/155 |
| 2010/0263283 A1* | 10/2010 | Yoshioka ........................ | 49/210 |

FOREIGN PATENT DOCUMENTS

| | | |
|---|---|---|
| DE | 757091 | 4/1942 |
| DE | 102008016550 | 5/2009 |
| DE | 102006026137 | 12/2009 |
| EP | 2008846 | 12/2008 |

\* cited by examiner

*Primary Examiner* — Katherine Mitchell
*Assistant Examiner* — Abe Massad
(74) *Attorney, Agent, or Firm* — Dillworth & Barrese; Dean Watson

(57) ABSTRACT

A sliding door for a vehicle includes a guide rail, a sliding carriage and a guide pin (34). The sliding carriage is longitudinally displaceably journalled at the guide rail and is connected by a multijoint to the vehicle body. The guide pin (34) is guided in a guide track (41) provided at the sliding door. To improve such a sliding door, the guide track (41) includes a first guide track (42) and a second guide track (43) which is elastically biased (47) with respect to the first guide track (42) (FIG. 4).

20 Claims, 5 Drawing Sheets

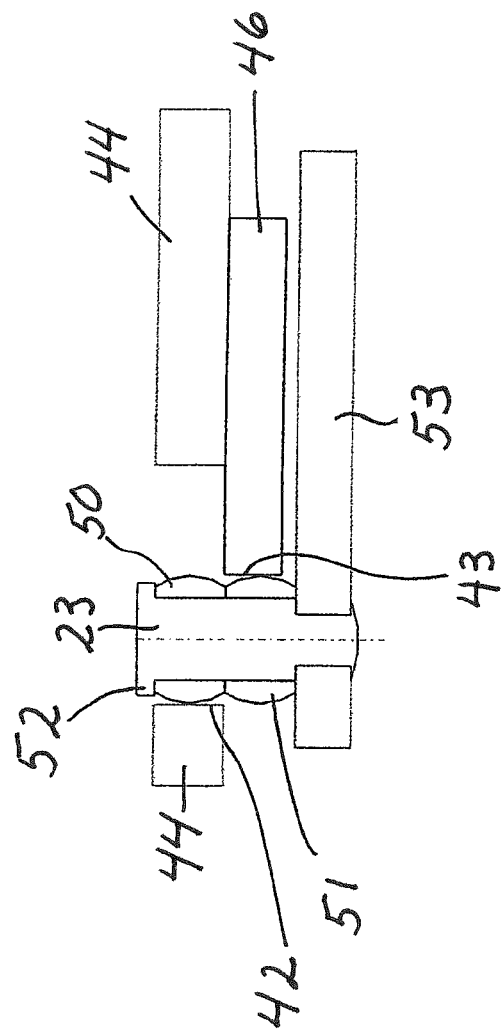

SLIDING DOOR FOR A VEHICLE

BACKGROUND OF THE INVENTION

The invention relates to a sliding door for a vehicle, in particular for a motor vehicle.

The sliding door includes a guide rail, a sliding carriage and a guide pin. The sliding carriage is longitudinally displaceably journalled at the guide rail and is connected by a multijoint to the vehicle body. The guide pin is guided in a guide track provided at the sliding door.

A sliding door of this kind is known from DE 10 2008 016 650 B3 to which reference is herewith explicitly made. In this sliding door, the multijoint includes a hinge bow which is rotatably journalled at the sliding carriage and at a body flange and a control lever which is rotatably journalled at the sliding carriage and at an or the body flange. The already known sliding door furthermore includes a first intermediate lever which is rotatably journalled at the control lever and a second intermediate lever which is rotatably journalled at the first intermediate lever and at the sliding carriage. The sliding door is rotatably and longitudinally displaceably journalled at the end remote from the multijoint by a centering. It can be locked there. The control lever has an extension at which the first intermediate lever is rotatably journalled. A guide pin is provided at the connection joint of the first intermediate lever and of the second intermediate lever and is guided in a guide track provided at the sliding door. The guide track extends in an inclined manner relative to the guide rail. The guide track in this respect extends in the direction away from the hinge bow in an outwardly inclined manner.

Another sliding door of the initially set forth kind is described in EP 2 008 846 A2 to which reference is likewise explicitly made. A drive rod is present here which is rotatably journalled at the control lever. The sliding door is rotatably and longitudinally displaceably journalled at the end remote from the multijoint by a centering. It can be locked there. The drive rod is rotatably journalled at the guide rail. The control lever has a lever arm at which the drive rod is rotatably journalled. A guide pin which is guided in a guide track provided at the sliding door is provided at an intermediate lever which is rotatably journalled at the sliding carriage.

A further sliding door of the initially set forth kind is known from the German patent application 10 2008 026 137.8 which has senior priority and is not pre-published and reference is likewise explicitly made to this. Here, the control lever has a lever arm at which the guide pin is provided which is guided in the guide track provided at the sliding door. The guide track preferably extends in the direction outwardly away from the hinge bow.

In the already known solutions, the guide pin is generally guided with a certain clearance in the guide track. If the guide track were manufactured without clearance, the friction of the guide pin could become too large so that the opening and closing movement of the sliding door would not be sufficiently smooth. The disadvantages of wear and/or of a reduced operating comfort can arise due to the clearance of the guide pin in the guide track.

SUMMARY OF THE INVENTION

It is the object of the invention to provide an improved sliding door of the initially set forth type.

This object is achieved in accordance with the invention by the features herein. The guide track includes a first guide track and a second guide track. The second guide track is elastically biased with respect to the first guide track. On the opening of the sliding door, the guide pin is supported at one of the two guide tracks, in particular at the first guide track. This guide track can be inwardly disposed. On the closing of the sliding door, the guide pin is supported at the other guide track, in particular at the second guide track. The second guide pin can be outwardly disposed. Since the first guide track and the second guide track are separate from one another and are elastically biased with respect to one another, the guide track overall can be made free of clearance.

Advantageous further developments are described herein.

The second guide track is preferably biased by a spring. The spring can be a tension spring or a compression spring.

It is advantageous if the second guide track is pivotably journalled with respect to the first guide track.

In accordance with a further advantageous further development, the first guide track and the second guide track are arranged above one another.

Two rollers can be provided at the guide pin. The rollers are guided in the guide tracks. It is advantageous if the rollers are arranged above one another.

The rollers are preferably made in ball shape. It is, however, also possible to make the rollers cylindrical or having a different shape.

The invention further relates to a vehicle, in particular to a motor vehicle, which is characterized by one or more sliding doors in accordance with the invention.

BRIEF DESCRIPTION OF THE DRAWINGS

An embodiment of the invention will be explained in detail in the following with reference to the enclosed drawing. There are shown in the drawing FIG. 1 a sliding door for a motor vehicle in accordance with the senior priority, not prepublished German patent application 10 208 026 137.8 in the closed position in a schematic view from above;

FIG. 5 a section along the line A-A in FIG. 4.

DESCRIPTION OF THE PREFERRED EMBODIMENTS

Figure 1:
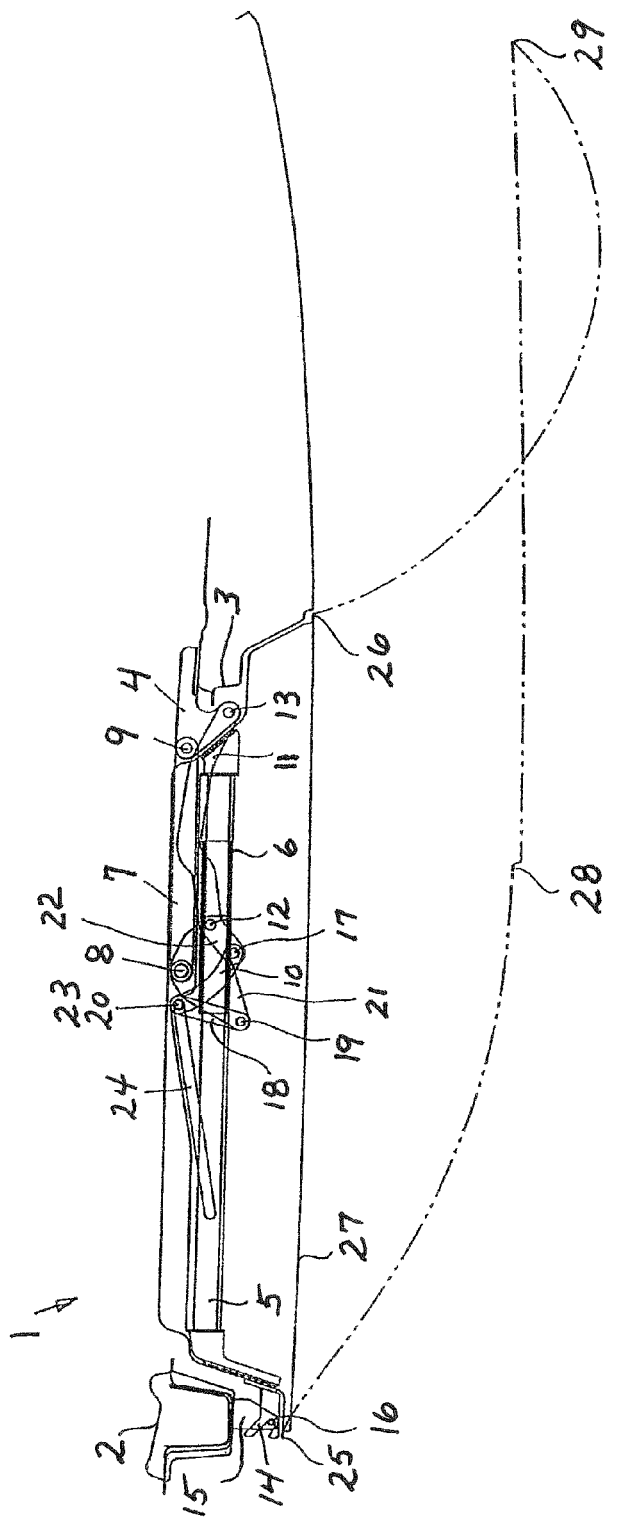
Figure 2:
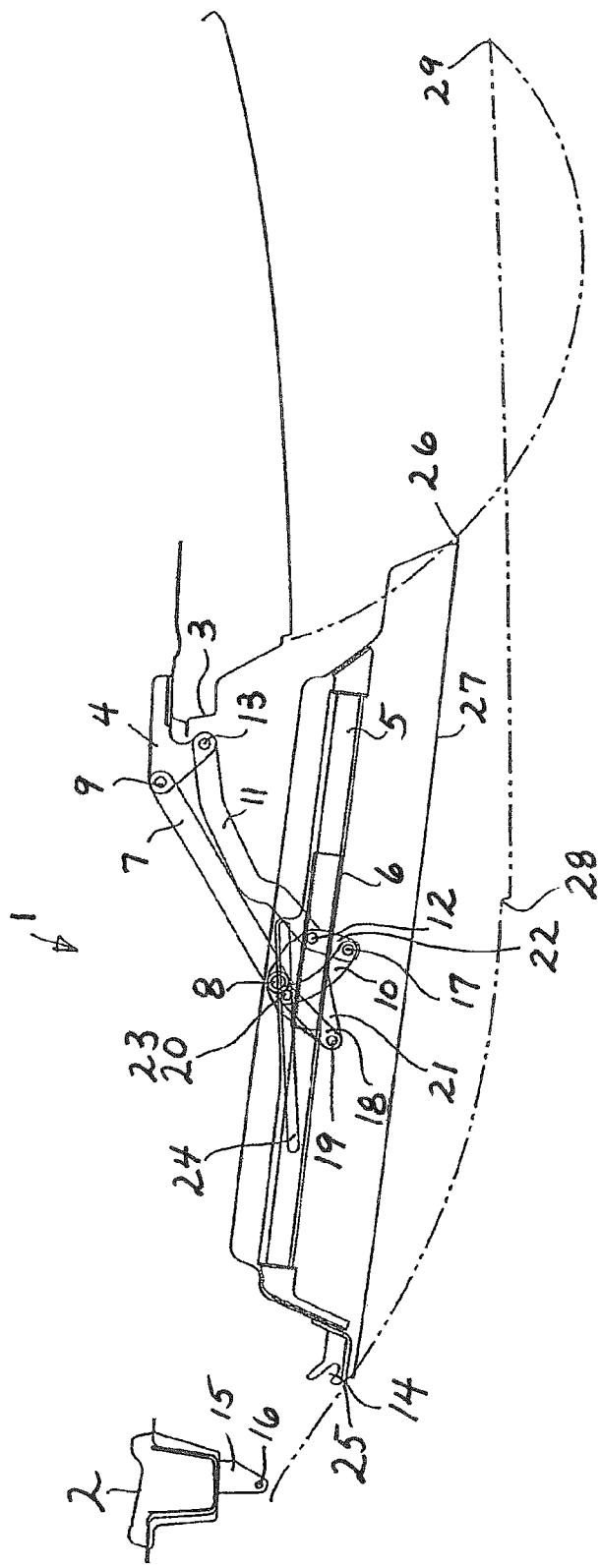
FIG. 2 the sliding door in accordance with FIG. 1 in a partly opened position in a schematic view from above corresponding to FIG. 1.
Figure 3:
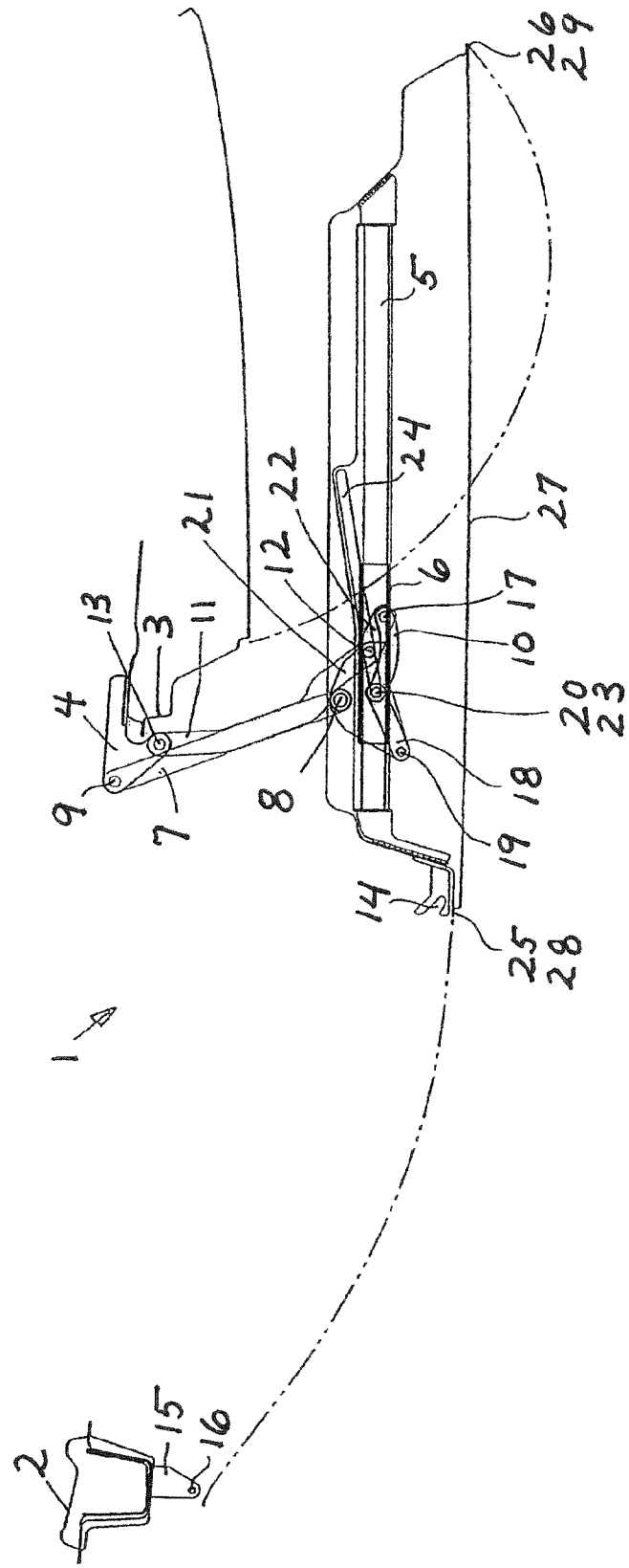
FIG. 3 the sliding door in accordance with FIGS. 1 and 2 in the completely opened position in a schematic view from above corresponding to FIGS. 1 and 2.

FIGS. 1, 2 and 3 show the sliding door 1 in accordance with an embodiment of the senior priority, not prepublished German patent application 10 2008 026 137.8. The sliding door 1 is the rear left hand door of a motor vehicle. It is located in the opening of the body between the B pillar 2 and a rear body part 3 in whose region a body flange 4 is connected to the body. The rear body part 3 can be the C pillar or the A pillar.

The sliding door 1 has a guide rail 5 at its inner side. A sliding carriage 6 is longitudinally displaceably journalled on the guide rail 5.

The sliding door 1 furthermore has a hinge bow 7 and a control lever 11. The hinge bow 7 is rotatably journalled about a joint 8 at the sliding carriage 6 and about a joint 9 at the body flange 4. The control lever 11 is rotatably journalled about a joint 12 at the sliding carriage 6 and about a joint 13 at the body flange 4.

A joint plate 21 which carries the joints 8 and 12 is fastened to the sliding carriage 6. The hinge bow 7, the control lever 11, the sliding carriage 6, the hinge plate 21 and the body flange 4 form a multijoint with the joints 8, 9, 12 and 13.

A U-shaped mount 14 which extends in an inclined manner toward the longitudinal direction of the vehicle, namely inwardly to the front in the direction of the vehicle, is provided at the sliding door 1 at the end of the sliding door 1 disposed opposite the hinge bow 7. It is open at its end remote from the hinge bow 7, in the embodiment at its front inner end. A hinge pin 16 which engages into the U-shaped mount 14 is provided at a body flange 15 which is fastened to the B pillar 2. In the completely closed position of the sliding door shown in FIG. 1, the hinge pin 16 is located at the base of the U-shaped mount 14. It can be locked there (not shown in the drawing).

The control lever 11 has a lever arm 33 which extends inwardly from the joint 12. In this respect, the lever arm 33 kinks inwardly with respect to the connection line between the joints 13 and 12, that is with respect to the longitudinal extent of the control lever 11. In the embodiment, the lever arm 33 kinks inwardly at an approximate right angle.

A guide pin 34 is provided at the lever arm 33, in the region of its end, and is guided in a guide track 24. The guide track 24 is provided at the sliding door 1. The guide track 24 is accordingly therefore a guide track fixed with respect to the door. It extends in an outwardly inclined manner relative to the guide track 5 in the direction away from the hinge bow 7. The guide track 24 is designed as continuously linear. Its inclination is the same over its total length.

In the completely closed position of the sliding door 1, which is shown in FIG. 1, the hinge pin 16 is disposed in the U-shaped mount 14, and indeed in the region of its end. The guide pin 34 is located in the region of the rear inner end of the guide track 24. The control lever 11 faces forward from the joint 13. The control lever 33 faces forward from the joint 12.

The position in accordance with FIG. 2 is passed through in the course of the opening movement. This opening movement can be produced in that the guide rail 5 is moved rearwardly relative to the sliding carriage 6. A motor, in particular an electric motor, can be present at the sliding carriage 6 for the drive of the guide rail 5 relative to the sliding carriage 6. Instead or additionally, the motor, in particular an electric motor, can be present to drive the hinge bow 7 and/or the control lever 11. It is advantageous if a motor is present at the body flange 4 or at another body part for driving the hinge bow 7 and/or the control lever 11.

The opening movement can, however, instead or additionally also be produced by hand. The guide rail 5 can in particular be moved manually to the rear relative to the sliding carriage 6. For this purpose, a handle or a plurality of handles can be provided at the sliding door 1 by which the sliding door 1 and with it the guide rail 5 can be moved relative to the sliding carriage 6. The handle can be provided at the inner front end of the sliding door 1 and/or at the outer front end of the sliding door 1 and/or at the outer rear end of the sliding door 1. The sliding door 1 can be opened and also closed again by an application of force to each of these three points.

The sliding carriage 6 could be freely displaced on the guide track 5 without the guide pin 34. The guide pin 34 guided in the guide track 24 prevents this free displaceability and fixes the relative position of the sliding carriage 6 with respect to the guide rail 5 and thus with respect to the sliding door 1. This takes place in the sections of the guide track 24 which have an inclination different from zero with respect to the guide rail 5, that is do not extend parallel to the guide rail 5. The guide track 24 has the same inclination different from zero with respect to the guide rail 5 along its total length.

If the guide rail 5 is moved rearwardly by a motor and/or manually relative to the sliding carriage 6, the guide pin 34 guided in the guide track 24 moves outwardly relative to the guide rail 5 and to the sliding carriage 6, whereby the control lever 11 is pivoted counter-clockwise about the joint 12. The control lever 11 is hereby pivoted counter clockwise about the joint 13 at the body flange 4. The hinge bow 7 is also pivoted counter clockwise about the joint 9 by the pivoting of the control lever 11. The joint plate 21 of the sliding carriage 6 is likewise guided in a compulsory manner by the pivoting of the hinge bow 7 about the joint 9 since it forms a multijoint with the hinge bow 7, the control lever 11 and the body flange 4—as stated.

The drive movement for the opening of the sliding door 1 can, however, also be initiated in another manner, in particular by a motorized and/or manual drive of the hinge bow 7 and/or of the control lever 11 about one or more of the joints 9, 8, 13, 12.

The completely open position of the sliding door 1 is shown in FIG. 3. The lever arm 33 was pivoted counter-clockwise. In the embodiment, the lever arm 33 was pivoted by somewhat more than 90° counter-clockwise. The guide pin 34 has reached the front, closed end of the guide track 24. The control lever 11 and the hinge bow 7 have been pivoted by an angle of about 120° counter-clockwise about the joints 13 and 9.

When the sliding door 1 should be closed, the described positions are run through in the reverse order. The closing movement of the sliding door 1 can be effected in that the guide rail 5 is moved to the front relative to the sliding carriage 6, in a motor driven and/or manual fashion. The relative movement of the guide rail 5 is transmitted by the guide track 24 to the guide pin 34 and is introduced from there via the lever arm lever 33 into the described multijoint. It is, however, also possible to initiate the closing movement in a manner such as was described for the opening movement.

The paths of the front end 25 and of the rear end 26 of the outer door panel 27 are drawn in FIGS. 1, 2 and 3. The front end 25 of the outer door panel 27 first moves at an angle of approximately 30° rearwardly and outwardly with respect to the longitudinal axis of the vehicle. The angle of inclination of the U-shaped mount 14 corresponds to this angle. It subsequently describes an arc with a large radius whose end 28 has a tangent extending parallel to the longitudinal axis of the vehicle. The rear end 26 of the outer door panel 27 first moves approximately at a right angle away from the body and then describes an arc which becomes tighter up to an end point 29 which has substantially the same spacing from the body of the vehicle as the end point 28 of the front end 25.

It is possible to open and close the sliding door by initiating a single movement. The sliding door can in particular be opened and closed by a movement of the guide rail 5 relative to the sliding carriage. It is, however, also possible to produce and initiate the opening movement and closing movement of the sliding door in a different manner, as described above.

A sliding door is realized by the embodiment in accordance with FIGS. 1 to 3 whose moving parts only require very little space in a direction transverse to the longitudinal axis of the vehicle. The maximum width of these moving parts is determined by the spacing between the position of the guide pin 34 in FIG. 1 and the position of the guide pin 34 in FIG. 3.

It is possible that the guide track 24 has a curved section at its rear inner end whose inclination is greater with respect to the guide rail 5 than the linear region (not shown in the drawing). The opening movement of the rear end 26 of the outer door panel 27 hereby extends out of the closed position in accordance with FIG. 1 at a right angle, that is, even more steeply than in FIG. 1. The outward pivoting movement of the sliding door can be controlled by the configuration of the inclination of the guide track.

It is advantageous if the guide pin 34 lies on the side of an imaginary line 35 remote from the body flange 4 or from the joints 9, 13 during the total movement process, said imaginary line extending through the joint 12, and indeed perpendicular to the connection line between the joints 13, 12 of the control lever 11. This line 35 is drawn by way of example in FIG. 1. Since the guide pin 34 lies before this line 35 during the total movement process, an "above dead center position" is avoided which could impede the opening movement and/or the closing movement of the sliding door or make it impossible.

Figure 4:
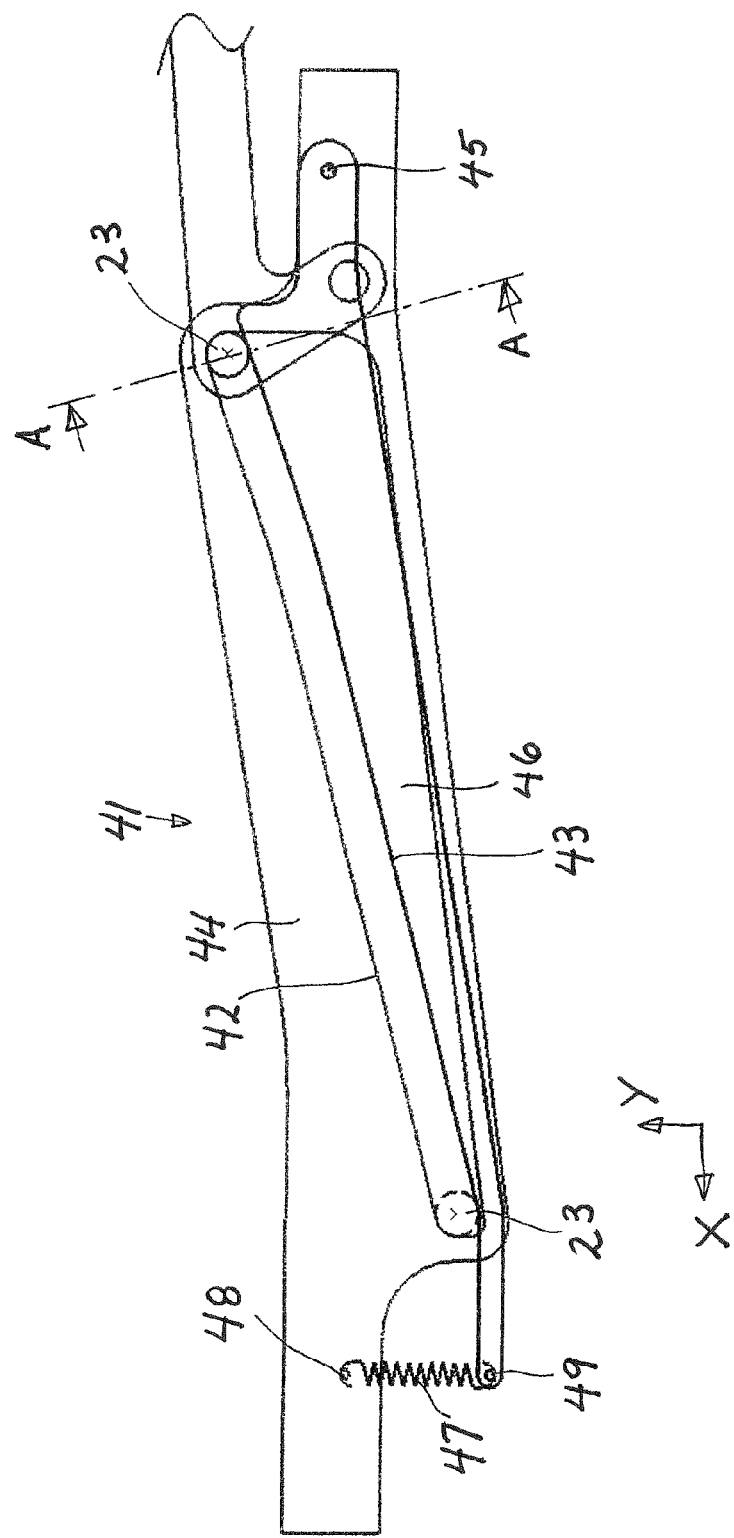
FIG. 4 a guide track for the sliding door in accordance with FIGS. 1 to 3 in a view from above.

FIGS. 4 and 5 show a guide track 41 in accordance with the invention which is made differently from the guide track 24 of the embodiment in accordance with FIGS. 1 to 3. The guide track 41 includes a first guide track 42 and a second guide track 43 which is elastically biased with respect to the first guide track 42. The first guide track 42 is connected to the sliding door. It is provided at a first guide track part 44. The first guide track part 44 is fastened to the sliding door. It includes the first guide track 42 and a pivot axle 45 for the second guide track 43. The second guide track 43 is provided at a second guide track part 46. The second guide track part 46 is pivotably journalled about the pivot axle 45.

The second guide track 43 is elastically biased by the tension spring 47 with respect to the first guide track 42. One end of the tension spring 47 is fastened to a fastening point 48 at the first guide track part 44, the other end of the tension spring 47 is fastened to a fastening point 49 at the second guide track part 46. The fastening point 49 contacts the end of the second guide track part 46 remote from the pivot axle 45. The fastening points 48, 49 are disposed further remote from the pivot axle 45 than the ends of the guide tracks 42, 43 remote from this pivot axle 45. Instead of the tension spring 47, in a correspondingly modified embodiment of the guide track parts 44, 46, a compression spring could also be used.

In FIG. 4, the longitudinal direction of the vehicle is labeled by x, with the associated arrow facing in the direction to the front. The direction to the inside is labeled by y in FIG. 4. The guide track 41 is formed by the first guide track 42 and the second guide track 43. As can be seen from FIG. 4, the guide track 41 extends in the direction to the front outside. It has a greater inclination to the outside in its rear region than in its front region. It could, however, also be designed as continuously linear.

The guide pin 34 is guided in the guide track 41. The guide pin 34 is provided at the control lever 11'. The control lever 11' is rotatably journalled about the joint 12 at the sliding carriage 6. Unlike the embodiment in accordance with FIGS. 1 to 3, the control lever 11' in the embodiment in accordance with FIGS. 4 and 5 has a lever arm 33' which extends outwardly from the guide pin 34. In this respect, the lever arm 33' kinks outwardly with respect to the connection line between the joint 13 and the guide pin 34, that is, with respect to the longitudinal extent of the control lever 11'. The kinematics of the control lever 11' of the joint 12 and of the guide pin 34 of the embodiment in accordance with FIGS. 4 and 5 are, however, substantially the same as the kinematics of the control lever 11, of the joint 12 and of the guide pin 34 of the embodiment in accordance with FIGS. 1 to 3.

As can be seen from FIG. 5, two rollers, namely an upper roller 50 and a lower roller 51, are provided at the guide pin 34. The rollers 50, 51 are rotatably journalled at the guide pin 34. The guide pin 34 has a head 52 larger in diameter at its upper end to bound the axial movement of the upper roller 50.

The guide pin 34 is fastened at its lower end to the control lever 11' of the multijoint. The control lever 11' forms a lower abutment for the lower roller 51.

The upper roller 50 is associated with the first guide track 42. The lower roller 51 is associated with the lower guide track 43. Accordingly, the guide tracks 42, 43 are arranged above one another like the rollers 50, 51. The rollers 50, 51 are further made in ball shape. They therefore have a profile which is curved outwardly convexly. It is in particular a partly spherical profile.

With a closed siding door, the guide pin 34 with the rollers 50, 51 is located at the rear end of the guide track 12. During the opening process, the guide pin 34 passes through the guide track 41 in the direction to the front. During this opening movement of the sliding door, the upper roller 50 is supported at the first guide track 42. The first guide track 42 takes up the force exerted by the upper roller 50. With a completely open siding door, the guide pin 34 with the rollers 50, 51 is located at the front end of the guide track 41.

When the sliding door is subsequently closed, the guide pin 34 with the rollers 50, 51 passes through the reverse path. It moves to the rear in the guide track 41. During this closing movement, the lower roller 51 is supported at the second guide track 43. The force exerted by the lower roller 51 of the guide pin 34 is received by the second guide track 43. The force of the tension spring 47 is in this respect dimensioned so strongly that the upper roller 50 does not raise from the first guide track 42 during this closing movement. In this manner, the guide pin 34 with the rollers 50, 51 moves without clearance in the guide track 41 formed by the first guide track 42 and by the second guide track 43.

In a modified embodiment which is not shown in the drawing, the second guide track part 46 is not pivotably journalled at the second guide track 43. A linear guide is rather provided at the position of the pivot axle 45 and a further linear guide is also provided in the region of the tension spring 47. The linear guides extend substantially in the direction from the outside to the inside. Both linear guides are spring-loaded.

The invention claimed is:

1. A sliding door (1) for a vehicle comprising a guide rail (5), having a sliding carriage (6) which is longitudinally displaceably supported on the guide rail (5) and connected by a multijoint (7, 11, 6, 4) to the vehicle body and having a guide pin (34) which is guided in a guide track assembly (41) provided on the sliding door (1), wherein
the guide track (41) includes a first guide track (42) and a second guide track (43) arranged for guiding the guide pin (34) therebetween along lengths thereof by contacting opposite sides of the guide pin (34), with the first and second guide tracks (42, 43) disposed at different heights and the second guide track (43) being elastically biased (47) with respect to the first guide track (42).

2. A sliding door in accordance with claim 1, wherein the second guide track (43) is biased by a spring (47).

3. A sliding door in accordance with claim 1, wherein the second guide track (43) is pivotably (45) journalled with respect to the first guide track (42).

4. A sliding door in accordance with claim 1, wherein the first guide track (42) and the second guide track (43) are arranged above one another.

5. A sliding door in accordance with claim 1, wherein two rollers (50, 51) are provided at the guide pin (34).

6. A sliding door in accordance with claim 5, wherein the rollers (50, 51) are configured as ball-shaped.

7. A vehicle, in particular a motor vehicle, having one or more sliding doors in accordance with claim 1.

8. A sliding door in accordance with claim 2, wherein the second guide track (43) is pivotably (45) journalled with respect to the first guide track (42).

9. A sliding door in accordance with claim 8, wherein the first guide track (42) and the second guide track (43) are arranged above one another.

10. A sliding door in accordance with claim 3, wherein the first guide track (42) and the second guide track (43) are arranged above one another.

11. A sliding door in accordance with claim 2, wherein the first guide track (42) and the second guide track (43) are arranged above one another.

12. A sliding door in accordance with claim 11, wherein two rollers (50, 51) are provided at the guide pin (34).

13. A sliding door in accordance with claim 10, wherein two rollers (50, 51) are provided at the guide pin (34).

14. A sliding door in accordance with claim 9, wherein two rollers (50, 51) are provided at the guide pin (34).

15. A sliding door in accordance with claim 1, wherein the first and second guide tracks (42, 43) and guide pin (34) are arranged with respect to one another, such that upon opening the sliding door (1), the guide pin (34) is supported by the first guide track (42) inwardly disposed from the second guide track (42) and upon closing the sliding door (1), the guide pin (34) is supported by the second guide track (42).

16. A sliding door in accordance with claim 3, wherein the first guide track (42) is connected to the sliding door (1) and comprises a pivot axle (45) about which the second guide track (43) is pivotally journalled.

17. A sliding door in accordance with claim 16, additionally comprising a tension spring (47) fastened at one end to a fastening point (48) on the first guide track (42) and at an opposite end to a fastening point (49) on the second guide track (43) remote from the pivot axle (45), such that said fastening points (48, 49) are disposed further from the pivot axle (45) than adjacent ends of the first and second guide tracks (42, 43).

18. A sliding door in accordance with claim 5, wherein said rollers (50, 51) and first and second guide tracks (42, 43) are arranged with respect to one another, such that upon opening the door (1), an upper roller (50) of said rollers (50, 51) is supported by the first guide track (42) as the guide pin (34) moves forwardly and upon closing the door (1), a lower roller (51) of said rollers (50, 51) is supported by the second guide track (43) as the guide pin (34) moves rearwardly.

19. A sliding door in accordance with claim 1, wherein said first guide track (42) is positioned both upwardly and inwardly from said second guide track (43) to define the guide track assembly (41) for the guide pin (34) therebetween, and additionally comprising a control lever (11') fastened to a lower end of the guide pin (34) and extending underneath the second guide track (43).

20. A sliding door in accordance with claim 1, wherein said guide pin (34) is positioned to be longitudinally guided along the guide track assembly (41) defined between the first and second guide tracks (42, 43) upon opening and closing the door (1).

* * * * *